United States Patent [19]

DeBroy et al.

[11] Patent Number: 5,070,149

[45] Date of Patent: Dec. 3, 1991

[54] CATIONIC RESIN COMPOSITION WITH REDUCED EMISSIONS DURING BAKING

[75] Inventors: Tapan K. DeBroy, Utica; Ding Y. Chung, Rochester Hills, both of Mich.

[73] Assignee: E. I. Du Pont de Nemours and Company, Wilmington, Del.

[21] Appl. No.: 509,412

[22] Filed: Apr. 9, 1990

[51] Int. Cl.$^5$ ............................................ C08F 265/10
[52] U.S. Cl. .................................. 525/296; 525/528; 525/533; 528/45; 524/555
[58] Field of Search ............... 525/456, 296, 533, 528; 528/45; 524/555

[56] References Cited

U.S. PATENT DOCUMENTS

| | | | |
|---|---|---|---|
| 4,296,010 | 10/1981 | Tominaga | 260/29.2 TN |
| 4,330,640 | 5/1982 | Buchwalter | 524/555 |
| 4,504,630 | 3/1985 | Buchwalter | 525/296 |
| 4,615,779 | 10/1986 | McCollum et al. | 204/181.7 |
| 4,698,402 | 10/1987 | Kordomenos et al. | 525/533 |
| 4,755,418 | 7/1988 | DeBroy et al. | 428/215 |
| 4,769,425 | 9/1988 | Dervan et al. | 525/528 |
| 4,781,808 | 11/1988 | Geist et al. | |

FOREIGN PATENT DOCUMENTS 0199663  10/1984  European Pat. Off. .
0303182  2/1987  European Pat. Off. .

Primary Examiner—John Knight, III
Assistant Examiner—Dvc Truong
Attorney, Agent, or Firm—Hilmar Fricke

[57] ABSTRACT

A novel cationic electrodepositable resin which offers reduced bake off lose, reduced yellowing of topcoats and very smooth film is disclosed. The backbone resin contains the basic polyepoxy amine adduct but it is crosslinked with a diol modified methylene diphenyl diisocyanate (MDI) which is blocked with a mixture of various alcohols.

9 Claims, No Drawings

CATIONIC RESIN COMPOSITION WITH REDUCED EMISSIONS DURING BAKING

TECHNICAL FIELD

The field of art to which this invention pertains is electrodepositable epoxy resins containing diol modified methylene diphenyl diisocyanate (MDI) crosslinking agents blocked with mixtures of various alcohols to be used in cathodic electrocoat processes.

BACKGROUND

The coating of electrically conductive substrates by electrodeposition is a well known and important industrial process. (For instance, electrodeposition is widely used in the automotive industry to apply primers to automotive substrates). In this process, a conductive article is immersed as one electrode in a coating composition made from an aqueous emulsion of film-forming polymer. An electric current is passed between the article and a counter-electrode in electrical contact with the aqueous emulsion, until a desired coating is produced on the article. The article to be coated is the cathode in the electrical circuit with the counter-electrode being the anode.

Resin compositions used in cathodic electrodeposition baths are also well known in the art. These resins are typically manufactured from polyepoxide resins which have been chain extended and adducted to include a nitrogen. The nitrogen is typically introduced through reaction with an amine compound. Typically these resins are blended with a crosslinking agent and then neutralized with an acid to form a water emulsion which is usually referred to as a principal emulsion.

The principal emulsion is combined with a pigment paste, coalescent solvents, water, and other additives (usually at the coating site) to form the electrodeposition bath. The electrodeposition bath is placed in an insulated tank containing the anode. The article to be coated is made the cathode and is passed through the tank containing the electrodeposition bath. The thickness of the coating is a function of the bath characteristics, the electrical operating characteristics, the immersion time, and so forth.

The coated object is removed from the bath after a set amount of time. The object is rinsed with deionized water and the coating is cured typically in an oven at sufficient temperature to produce crosslinking.

The prior art of cathodic electrodepositable resin compositions, coating baths, and cathodic electrodeposition processes are disclosed in U.S. Pat. Nos. 3,922,253; 4,419,467; 4,137,140; and 4,468,307, which are incorporated herein by reference.

Three very important characteristics of an electrocoat system are its nonyellowing characteristics, its bake off losses, and smoothness. Nonyellowing is important since typically an electrocoat will be covered with top coats (i.e. monocoat or base coat/clear coat). Current electrocoat systems cause yellowing of light colored topcoats. This is thought to be caused by the use of toulene diisocyanate (TDI) as part of the crosslinker.

Bake off loss means the loss of resin and solvents during the baking of the coating composition. A reduction in bake off loss is desirable because it results in less emissions to the environment, less oven fouling, and substantial cost savings since more coating composition is retained on the coated substrate. Current electrocoat systems have typical bake off loss of about 14 to 16 percent.

It is very important that the electrodeposited layer be of high quality even though it typically will be covered with top coats. Defects in the electrodeposited layer such as cratering or roughness may telegraph through the top coats. Therefore, it is necessary that the electrocoat primer be smooth.

SUMMARY OF THE INVENTION

It has been discovered that by using a novel crosslinking agent, electrodeposition coatings can be formed which give significantly improved nonyellowing characteristics and reduced bake off losses while maintaining smoothness. In addition other characteristics such as corrosion and chip resistance, throw power, film build, and bath stability are either maintained or improved. More specifically, a cathodic electrodepositable resin composition of the type comprising an epoxy amine adduct, blended with a diol modified methylene diphenyl diisocyanate (MDI) crosslinker which is blocked with a mixture of various alcohols, and then neutralized to form a principal emulsion is disclosed. The improvement therein being the use of the diol modified MDI blocked with the mixture of various alcohols as the crosslinker.

DETAILED DESCRIPTION OF THE INVENTION

As previously mentioned, it is well known that most principal emulsions in electrodeposition baths comprise an epoxy amine adduct blended with a cross-linking agent and neutralized with an acid in order to get a water soluble product. Typical crosslinkers used in the prior art are aliphatic and aromatic isocyanates such as hexamethylene diisocyanate, toluene diisocyanate, methylene diphenyl diisocyanate and so forth. These isocyanates are pre-reacted with a blocking agent such as oximes and alcohols which block the isocyanate functionality (i.e. the crosslinking functionality). Upon heating the blocking agents separate and crosslinking occurs.

The key to choosing a cross-linking agent which is suitable for use at desired cure conditions is finding one with the right reactivity and the correct unblocking temperature.

The cross-linking agent of this invention is diol modified methylene diphenyl diisocyanate (MDI). (Crude MDI, available commercially under the trade names Mondur MR ® and Mondur MRS ® and so forth from Mobay Corporation, which contains more than two isocyanate functional groups will achieve the desired nonyellowing characteristic and reduced bake off loss but is not suitable because of unsatisfactory film smoothness). A key to this invention is the linearity of the crosslinker. Linearity means a straight chain oligomer without side branches. A linear crosslinker gives smooth appearance. While pure MDI is linear it has the disadvantage of being crystalline at room temperature which makes it difficult to process. On the other hand diol modified MDI is also linear but is liquid at room temperature and has a lower glass transition temperature.

The diol used to modify the MDI is polyether polyol such as polyethylene oxide diol, polypropylene oxide diol and polybutylene oxide diol. In a preferred embodiment, the MDI is modified with dipropylene oxide glycol, tripropylene oxide glycol or a mixture of the two. The total weight of the diols in the diol modified MDI is from 2 to 60 percent, preferrably 5 to 45 percent and most preferrably 5 to 20 percent. Diol modified MDIs are available from Dow Chemical Company under the trade name Isonate 181 ® and from Mobay Corporation under the trade name Mondur PF ®.

In the preferred embodiment the diol modified MDI is made by adding a mixture of dipropylene oxide glycol and tripropylene oxide glycol to pure MDI. The dipropylene oxide glycol and tripropylene oxide glycol mixture is made by adding equal portions by weight of both glycols. This glycol mixture is then added slowly to pure MDI which has been heated to 70° C. There will be an exotherm. The reaction temperature should remain between 80°-100° C. The NCO equivalent weight of the reaction is checked and once it has reached the desired NCO equivalent weight, the reaction is complete.

The reaction product will be a mixture of the following:

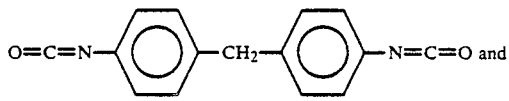

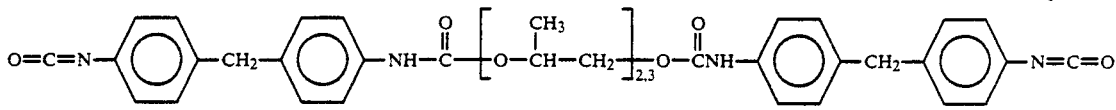

This product is available from Dow Chemical Company under the trade name Isonate 181 ®.

The diol modified MDI crosslinker is then reacted with a mixture of alcoholic blocking agents. The mixture of alcoholic blocking agents is important in order to get both reduced bake off and smooth film. Lower molecular weight alcohols are necessary for reduced bake off loss. The lower molecular weight alcohol(s) should have a molecular weight of below 75. Typical low molecular weight alcohols are methanol, ethanol, propanol and butanol. Most of the bake off loss is due to the unblocking of the alcohol from the crosslinker during the bake. Thus the bake off loss is proportional to the molecular weight of the blocking alcohol. Obviously, the lower the molecular weight of the blocking agent the lower the bake off loss.

However, higher molecular weight glycol ether alcohol(s) is also needed for smoothness. The smoother film is at least partially thought to be achieved because the higher boiling point of higher molecular weight glycol ether alcohol acts as a "tail solvent" to help the film flow out during baking. The glycol ether alcohol(s) should have a molecular weight of 118 or above. The glycol ether alcohol(s) could be one single glycol ether alcohol or a mixture of various ones. Typical glycol ether alcohols are diethylene glycol mono butyl ether, ethylene glycol mono hexyl ether and ethylene glycol mono butyl ether and so forth.

We have found that the reaction process for preparing the blocked diol modified MDI is important. The lower molecular weight alcohol(s) and higher molecular weight glycol ether alcohol(s) should be premixed before blocking the diol modified MDI. The premixed alcohols are then added to the diol modified MDI and allowed to react to completion. The reaction is carried out at a temperature of about 60° C. to 100° C. until all the isocyanate functionality disappears. The reaction is carried out at about 70 percent nonvolatiles. The preferred solvent is methyl isobutyl ketone (MIBK). In our mixture of alcohols the range of molar ratios of low molecular weight alcohol to high molecular weight glycol ether alcohols is preferably 9.0:1.0 to 1.0:2.0; more preferably 5.0:1.0 to 1 0 1 5 and most preferably 4.0:1.0 to 1.0:1.0. The total blocking agent mixture is usually added in an equivalent ratio of 1.0:1.0 to the polyisocyanate.

The premixing of the lower molecular weight alcohol(s) with the higher molecular weight glycol ether alcohol(s) is important because we have found that a lower molecular weight alcohol blocked diol modified MDI becomes solid wax at room temperature. Surprisingly, the reaction product of premixed lower molecular weight alcohol and higher molecular weight glycol ether and diol modified MDI remains liquid at room temperature.

Using the novel blocked polyisocyanate crosslinker described above it has been found that bake off losses can be reduced to as little as 9-11 percent. This is a significant reduction when compared to the current commercial cathodic electrocoat compositions which have bake off losses of 14-16 percent.

The polyepoxide resins which are used in the practice of the invention are polymers having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxy-3-tertiarybutylphenyl)propane, 1,1-bis-(4-hydroxyphenyl)ethane, 2-methyl-1,1-bis-(4-hydroxyphenyl) propane, 2,2-bis-(4-hydroxy-3-tertiarybutylphenyl)propane, bis-(2-hydroxynaphthyl) methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol, 1,4-cyclohexanediol, 1,2-bis(hydroxymethyl)cyclohexane, 1,3-bis-(hydroxymethyl)cyclohexane and hydrogenated bisphenol A.

The polyepoxides have molecular weights of at least 200 and preferably within the range of 200 to 2000, and more preferably about 340 to 2000.

The polyepoxides are preferably chain extended with a polyether or a polyester polyol which enhances flow and coalescence. Examples of polyether polyols and conditions for chain extension are disclosed in U.S. Pat. No. 4,468,307. Examples of polyester polyols for chain extension are disclosed in U.S. Pat. No. 4,148,772.

The polyepoxide is reacted with a cationic group former, for example, an amine and then neutralized with an acid.

The amines used to adduct the epoxy resin are monoamines, particularly secondary amines with primary hydroxyl groups. When reacting the secondary amine containing the primary hydroxyl group with the terminal epoxide groups in the polyepoxide the result is the amine/epoxy adduct in which the amine has become tertiary and contains a primary hydroxyl group. Typical amines that can be used in the invention are methyl ethanol amine, diethanol amine and so forth.

In addition to the amines disclosed above, a portion of the amine which is reacted with the polyepoxide-polyether polyol product can be the ketimine of a polyamine. This is described in U.S. Pat. No. 4,104,147 in column 6, line 23, to column 7, line 23, the portions of which are hereby incorporated by reference. The ketimine groups will decompose upon dispersing the amine-epoxy reaction product in water resulting in free primary amine groups which would be reactive with curing agents.

Mixtures of the various amines described above can be used. The reaction of the secondary amine with the polyepoxide resin takes place upon mixing the amine with the polyepoxide. The reaction can be conducted neat, or, optionally in the presence of suitable solvent. The reaction may be exothermic and cooling may be desired. However, heating to a moderate temperature, that is, within the range of 50° to 150° C., may be used to hasten the reaction.

The reaction product of amine with the polyepoxide resin attains its cationic character by at least partial neutralization with acid. Examples of suitable acids include organic and inorganic acids such as formic acid, acetic acid, lactic acid, and phosphoric acid. The extent of neutralization will depend upon the particular product involved. It is only necessary that sufficient acid be used to disperse the product in water. Typically, the amount of acid used will be sufficient to provide at least 30 percent of the total theoretical neutralization. Excess acid beyond that required for 100 percent total theoretical neutralization can also be used.

The extent of cationic group formation of the resin should be selected such that when the resin is mixed with aqueous medium, a stable dispersion will form. A stable dispersion is one which does not settle or is one which is easily redispersible if some sedimentation occurs. In addition, the resin should be of sufficient cationic character that the dispersed resin particles will migrate towards the cathode when there is an electrical potential between an anode and a cathode immersed in the aqueous dispersion.

In general, most of the cationic resins prepared by the process of the invention contain from about 10 to 300, preferably from about 30 to 100 milliequivalents of cationic group per hundred grams of resin solids.

The cationic resinous binder (the epoxy/amine adduct) should preferably have weight average molecular weights, as determined by gel permeation chromatography using a polystyrene standard, of less than 100,000, more preferably less than 75,000 and most preferably less than 50,000 in order to achieve high flowability.

The cationic resin and the blocked isocyanate are the principal resinous ingredients in the principal emulsion and are usually present in amounts of about 30 to 50 percent by weight of solids.

Besides the resinous ingredients described above, the electrocoating compositions usually contain a pigment which is incorporated into the composition in the form of a paste. The pigment paste is prepared by grinding or dispersing a pigment into a grinding vehicle and optional ingredients such as wetting agents, surfactants, and defoamers. Pigment grinding vehicles are well known in the art. After grinding, the particle size of the pigment should be as small as practical, generally, a Hegman grinding gauge of about 6 to 8 is usually employed.

Pigments which can be employed in the practice of the invention include titanium dioxide, basic lead silicate, strontium chromate, carbon black, iron oxide, clay and so forth. Pigments with high surface areas and oil absorbencies should be used judiciously because they can have an undesirable effect on coalescence and flow.

The pigment-to-resin weight ratio is also fairly important and should be preferably less than 50:100, more preferably less than 40:100, and usually about 20 to 40:100. Higher pigment-to-resin solids weight ratios have also been found to adversely affect coalescence and flow.

The coating compositions of the invention can contain optional ingredients such as wetting agents, surfactants, defoamers and so forth. Examples of surfactants and wetting agents include alkyl imidazolines such as those available from Ciba-Geigy Industrial Chemicals as Amine C ®, acetylenic alcohols available from Air Products and Chemicals as Surfynol 104 ®. These optional ingredients, when present, constitute from about 0 to 20 percent by weight of resin solids. Plasticizers are optional ingredients because they promote flow. Examples are high boiling water immiscible materials such as ethylene or propylene oxide adducts of nonyl phenols or bisphenol A. Plasticizers can be used and if so are usually used at levels of about 0 to 15 percent by weight resin solids.

Curing catalysts such as tin catalysts are usually present in the composition. Examples are dibutyltin dilaurate and dibutyltin oxide. When used, they are typically present in amounts of about 0.05 to 2 percent by weight tin based on weight of total resin solids.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferrably 5 to 40 percent by weight resin solids. Aqueous resin concentrates which are to be further diluted with water, generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

EXAMPLES

Example A

Backbone Resin

The following ingredients were charged into a suitable reaction vessel: 1394.8 parts Epon 828 ® (epoxy from Shell Company having an epoxy equivalent weight of 188); 527.2 parts Bisphenol A; 395.6 parts Tone 200 ® (from Union Carbide, hydroxy equivalent weight of 263.6); and 101.2 parts xylene. The charge is heated to 145° C. under a nitrogen blanket. 2.4 parts dimethyl benzyl amine was added and the mixture held at 147° C. until a 1170 epoxy equivalent weight was obtained. The mixture was cooled to 98° and 153.2 parts diketimine (reaction product of diethylene triamine and methyl isobutyl ketone; at 72.7% non-volatile) and 118.2 parts methylethanol amine were added. The mixture was held at 120° C. for one hour, then 698.5 parts methyl isobutyl ketone was added. The resin had a final non-volatile of 75%.

Example B

Preparation of Crosslinker

A blocked polyisocyanate was prepared by charging 1840 parts of Isonate 181 ® (diol modified MDI from Dow Chemical Company) and 1010.7 parts of methyl isobutyl ketone. The charge was heated to 37° C. under a dry nitrogen blanket, and 0.3 parts of dibutyl tin dilaurate was added. The mixture of 109.3 parts of methanol, 156.2 parts of ethanol, and 515.5 parts of diethylene glycol monobutyl ether was charged slowly keeping the reaction temperature below 93° C. The mixture was maintained at 93° C. for 1 hour until essentially all the isocyanate was consumed as indicated by infrared scan. Butanol, 112.3 parts, was added. This resin had nonvolatile of 70 percent.

Example

Preparation of Crosslinker

A blocked polyisocyanate was prepared by charging 910.0 parts Mondur PF (from Mobay Corp.) into a suitable reaction vessel. 0.15 parts dibutyltin dilaurate was added. 489.0 parts anhydrous methyl isobutyl ketone was added under a nitrogen blanket. 64.0 parts methanol was added to the mixture keeping the temperature under 93° C. 148.0 parts butanol was added, then 146.0 parts hexylcellosolve (from Union Carbide Co.) was added. The temperature of the mixture was kept at 53° C. for one hour until essentially all isocyanate was consumed. 54.3 parts butanol was added. The final non-volatile of the mixture was 70.0%.

Example D

Preparation of Crosslinker

A blocked polyisocyanate was prepared by charging 910.0 parts Isonate 181 ® (from Dow Chemical Co.); 0.15 parts dibutyltin dilaurate, and 527.5 parts anhydrous methyl isobutyl ketone into a suitable reaction vessel under a nitrogen blanket. 296.0 parts butanol was added while the temperature of the mixture was kept at 93° C. 162.0 parts Dowanol DB ® (from Dow Chemical Co.) was added. The mixture was kept at 100° C. for one hour until essentially all isocyanate was consumed. 58.6 parts butanol was added. The final non-volatile of the mixture was 70.0%.

Example E

Quaternizing Agent

|  | Weight | Solids |
|---|---|---|
| 2-Ethyl Hexanol Half-Capped TDI in MIBK | 320.0 | 304.0 |
| Dimethyl Ethanolamine | 87.2 | 87.2 |
| Aqueous Lactic Acid Solution | 117.6 | 88.2 |
| 2-Butoxy Ethanol | 39.2 | — |
| Total | 564.0 | 479.4 |

Pigment Grinding Vehicle

|  | Weight | Solids |
|---|---|---|
| Epon 829 ® | 710.0 | 682.0 |
| Bisphenol A | 289.6 | 289.6 |
| 2-Ethyl Hexanol Half-Capped TDI in MIBK | 406.0 | 386.1 |
| Quaternizing Agent (from above) | 496.3 | 421.9 |
| Deionized Water | 71.2 | — |
| 2-Butoxyethanol | 1095.2 | — |
| Total | 3068.3 | 1779.6 |

The quaternizing agent was prepared by adding dimethyl ethanol amine to the 2-ethylhexanol half-capped toluene diisocyanate (TDI) in a suitable reaction vessel at room temperature. The mixture exothermed, and was stirred for one hour at 80° C. Lactic acid was then charged followed by the addition of 2-butoxy ethanol. The reaction mixture was stirred for about one hour at 65° C. to form the desired quaternizing agent.

To form the pigment grinding vehicle, Epon 829° (a diglycidyl ether of Bisphenol A from Shell Chemical Company), and Bisphenol A were charged under a nitrogen atmosphere to a suitable reaction vessel and heated to 150° C.-160° C. to initiate the exothermic reaction. The reaction mixture was permitted to exotherm for one hour at 150° C.-160° C. The reaction mixture was then cooled to 120° C., and the 2-ethylhexanol half-capped toluene diisocyanate was added. The temperature of the reaction mixture was held at 110° C.-120° C. for one hour, followed by the addition of 2-butoxy ethanol. The reaction mixture was then cooled to 85° C., homogenized, and charged with water, followed by the addition of the quaternizing agent prepared above. The temperature of the reaction mixture was held at 80° C.-85° C., until an acid value of one was obtained. The reaction mixture has a solids content of 58%.

Example F

Pigment Paste

|  | Weight | Solids |
|---|---|---|
| Dispersion Resin (from Example C) | 266.4 | 154.5 |
| Deionized Water | 454.6 | — |
| Titanium Dioxide | 272.0 | 272.0 |
| Aluminum Silicate | 74.1 | 74.1 |
| Lead Silicate | 24.7 | 24.7 |
| Carbon Black | 24.7 | 24.7 |
| Dibutyl Tin Oxide | 16.5 | 16.5 |

-continued

|  | Weight | Solids |
|---|---|---|
| Total | 1133.0 | 566.5 |

The above ingredients were combined in a suitable mixing vessel, and mixed at high speed until homogenous. It was then dispersed in a sand grinder until a Hegman reading of seven or greater was obtained. The non-volatile was 50.0%.

Example G

Pigment Paste

|  | Weight | Solids |
|---|---|---|
| Dispersion Resin (from Example C) | 218.59 | 126.77 |
| Deionized Water | 446.95 | — |
| Titanium Dioxide | 272.0 | 272.0 |
| Aluminum Silicate | 74.1 | 74.1 |
| Lead Silicate | 24.7 | 24.7 |
| Carbon Black | 24.7 | 24.7 |
| Dibutyl Tin Oxide | 16.5 | 16.5 |
| Total | 1077.54 | 538.77 |

The above ingredients were combined in a suitable mixing vessel, and mixed at high speed until homogenous. It was then dispersed n a sand grinder until a Hegman reading of seven or greater was obtained. The non-volatile was 50.0%.

Example H

Emulsion

|  | Weight | Solids |
|---|---|---|
| Backbone Resin (from Example A) | 553.19 | 414.88 |
| Crosslinker (from Example B) | 319.15 | 223.41 |
| Hexylcellosolve ® | 38.30 | — |
| Surfactant* | 6.38 | — |
| Acetic Acid | 11.52 | — |
| Deionized Water | 871.46 | — |
| Total | 1800.00 | 638.29 |

*Surfactant is a mixture of 120 parts Amine C ® from Ciba Geigy, 120 parts acetylenic alcohol, commercially available as Surfynol 104 ® from Air Products and Chemicals, Inc., 120 parts of 2-butoxy ethanol, 221 parts by weight of deionized water, and 19 parts glacial acetic acid.

Thoroughly mix the backbone resin from Example A, crosslinker from Example B, hexylcellosolve ®, acetic acid, and surfactant. Then the deionized water was added under agitation. This mixture was allowed to mix until a majority of the organic ketone had evaporated. The emulsion nonvolatile was adjusted to 35.5% with the necessary amount of deionized water.

Example I

Emulsion

|  | Weight | Solids |
|---|---|---|
| Backbone Resin (from Example A) | 553.19 | 414.88 |
| Crosslinker (from Example C) | 319.15 | 223.41 |
| Hexylcellosolve ® | 38.30 | — |
| Surfactant* (described above) | 6.38 | — |
| Acetic Acid | 11.52 | — |
| Deionized Water | 871.46 | — |
| Total | 1800.00 | 638.29 |

Thoroughly mix the backbone resin from Example A, crosslinker from Example B, hexylcellosolve ®, acetic acid, and surfactant. Then the deionized water was added under agitation. This mixture was allowed to mix until a majority of the organic ketone had evaporated. The emulsion nonvolatile was adjusted to 35.5% with the necessary amount of deionized water.

Example J

Emulsion

|  | Weight | Solids |
|---|---|---|
| Backbone Resin (from Example A) | 553.19 | 414.88 |
| Crosslinker (from Example D) | 319.15 | 223.41 |
| PPH | 38.30 | — |
| Surfactant* (described above) | 6.38 | — |
| Lactic Acid | 19.58 | — |
| Deionized Water | 863.40 | — |
| Total | 1800.00 | 638.29 |

Thoroughly mix the backbone resin from Example A, crosslinker from Example B, hexylcellosolve ®, acetic acid, and surfactant. Then the deionized water was added under agitation. This mixture was allowed to mix until a majority of the organic ketone had evaporated. The emulsion nonvolatile was adjusted to 35.5% with the necessary amount of deionized water.

Example 1

Electrocoat Bath

|  | Weight | Solids |
|---|---|---|
| Emulsion (from Example J) | 1622.50 | 576.00 |
| Deionized Water | 1929.50 | — |
| Pigment Paste (from Example F) | 448.00 | 224.00 |
| Total | 4000.00 | 800.00 |

The electrocoat bath was prepared by blending the above ingredients, the final nonvolatile was 20.0%. The electrocoat bath had a conductivity of 1772 microsiemens and a pH of 6.52. A zinc phosphate pretreated cold rolled steel panel was cathodically electrocoated in the 88° F. bath at 240 volts for two minutes. The panel was cured at 360° F. for 17 minutes. The cured film thickness was .75 mils and had very good smoothness.

Example 2

Electrocoat Bath

|  | Weight | Solids |
|---|---|---|
| Emulsion (from Example H) | 1622.50 | 576.00 |
| Deionized Water | 1929.50 | — |
| Pigment Paste (from Example F) | 448.00 | 224.00 |
| Total | 4000.00 | 800.00 |

The electrocoat bath was prepared by blending the above ingredients, the final nonvolatile was 20.0%. The electrocoat bath had a conductivity of 2300 microsiemens and a pH of 5.80. A zinc phosphate pretreated cold rolled steel panel was cathodically electrocoated in the 88° F. bath at 250 volts for two minutes. The panel was cured at 360° F. for 17 minutes. The cured film thickness was 0.87 mils and had very good smoothness.

Example 3

Electrocoat Bath

|  | Weight | Solids |
| --- | --- | --- |
| Emulsion (from Example I) | 1622.50 | 576.00 |
| Deionized Water | 1929.50 | — |
| Pigment Paste (from Example G) | 448.00 | 224.00 |
| Total | 4000.00 | 800.00 |

The electrocoat bath was prepared by blending the above ingredients, the final nonvolatile was 20.0%. The electrocoat bath had a conductivity of 1843 microsiemens and a pH of 6.09. A zinc phosphate pretreated cold rolled steel panel was cathodically electrocoated in the 88° F. bath at 125 volts for two minutes. The panel was cured at 360° F. for 17 minutes. The cured film thickness was 0.90 mils and had very good smoothness.

We claim:

1. In a resin composition for use as the film forming component for cationic electrodepositing paints, the resin composition comprising the reaction product of
   (A) a basic polyepoxide/amine adduct resin containing amino groups and hydroxyl groups capable of reacting with isocyanate groups, with
   (B) a blocked polyisocyanate crosslinker; wherein the improvement comprises:
   the blocked polyisocyante crosslinker is the reaction product of
   (i) polyether polyol modified methylene diphenyl diisocyanate; and
   (ii) a mixture of blocking agents consisting essentially of
      (a) an alcohol with a molecular weight of less than 75, or a mixture of such alcohols; and
      (b) a glycol ether alcohol with a molecular weight of 118 or above, or a mixture of such glycol ether alcohols; wherein the molar ratio of the alcohol with a molecular weight of less than 75 or mixture of such alcohols to the glycol ether alcohol with a molecular weight of 118 or above or mixture of such glycol ether alcohols is 9.0:1.0 to 1.0:2.0.

2. The resin composition of claim 1 wherein the diol used to modify the methylene diphenyl diisocyanate is polyethylene oxide diol, polypropylene oxide diol, polybutylene oxide diol, or any mixture thereof.

3. The resin composition of claim 2 wherein the diol is dipropylene oxide glycol, tripropylene oxide glycol or any mixture thereof.

4. The resin composition of claim 3 wherein the total weight of the diol is 5 to 20 percent of the weight of the diol modified methylene diphenyl diisocyanate.

5. The resin composition of claim 1 wherein the alcohol with a molecular weight less than 75 is methanol or ethanol.

6. The resin composition of claim 5 wherein the glycol ether alcohol is diethylene glycol mono butyl ether.

7. The resin composition of claim 1 wherein the molar ratio of the alcohol with a molecular weight of less than 75 (or mixture of such alcohols) to the glycol ether alcohol with a molecular weight of 118 or above (or mixture of such glycol ether alcohols) is 5.0:1.0 to 1.0:1.5.

8. The resin composition of claim 7 wherein the molar ratio of the alcohol with a molecular weight of less than 75 (or mixture of such alcohols) to the glycol ether alcohol with a molecular weight of 118 or above (or mixture of such glycol ether alcohols) is 4.0:1.0 to 1.0:1.0.

9. A method of preparing the resin of claim 1 comprising:
   (1) premixing the alcohols of (B)(ii)(a) and (B)(ii)(b) in order to prepare a blocking agent;
   (2) mixing the blocking agent with a diol modified methylene diphenyl diisocyanate to form a blocked isocyanate crosslinker; and
   (3) reacting the blocked isocyanate crosslinker with a basic polyepoxide amine adduct resin.

* * * * *